(12) United States Patent
Kruglick

(10) Patent No.: US 10,467,212 B2
(45) Date of Patent: Nov. 5, 2019

(54) MULTIPLE VARIABLE COVERAGE MEMORY FOR DATABASE INDEXING

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 856 days.

(21) Appl. No.: 13/634,013

(22) PCT Filed: Apr. 27, 2012

(86) PCT No.: PCT/US2012/035559
§ 371 (c)(1),
(2), (4) Date: Sep. 11, 2012

(87) PCT Pub. No.: WO2013/162607
PCT Pub. Date: Oct. 31, 2013

(65) Prior Publication Data
US 2013/0290343 A1 Oct. 31, 2013

(51) Int. Cl.
*G06F 16/20* (2019.01)
*G06F 16/22* (2019.01)
(52) U.S. Cl.
CPC .............................. *G06F 16/2228* (2019.01)
(58) Field of Classification Search
CPC ......... G06F 17/30946; G06F 17/30952; G06F 17/30321; G06F 17/30336; G06F 17/303; G06F 17/3051
USPC ........................................................ 707/741
See application file for complete search history.

(56) References Cited

U.S. PATENT DOCUMENTS

| | | | |
|---|---|---|---|
| 6,122,628 A | 9/2000 | Castelli et al. | |
| 6,950,823 B2 | 9/2005 | Amiri et al. | |
| 7,529,903 B2 | 5/2009 | Boss et al. | |
| 7,669,026 B2* | 2/2010 | Boss et al. | 711/165 |
| 7,685,109 B1* | 3/2010 | Ransil et al. | 707/999.003 |

(Continued)

FOREIGN PATENT DOCUMENTS

| | | |
|---|---|---|
| CN | 1216841 | 5/1999 |
| CN | 1708757 | 12/2005 |

(Continued)

OTHER PUBLICATIONS

International Searching Authority, International Search Report and Written Opinion of The International Searching Authority for PCT/US12/35559, dated Jul 30, 2012.

(Continued)

*Primary Examiner* — Kristopher Andersen
(74) *Attorney, Agent, or Firm* — IP Spring

(57) ABSTRACT

Technologies related to multiple variable coverage memory for database indexing are generally described. Disclosed methods may be performed to implement high-speed database access to digital service provider customer data as the digital service provider builds an optimized index for a database. Initially, the digital service provider may maintain an appropriate level of service by keeping a relatively slow performing, basic index in a relatively high performance first memory. As the digital service provider builds the optimized index, the digital service provider may maintain the appropriate level of service by gradually shifting from use of the first memory to the use of a relatively lower performance second memory.

18 Claims, 7 Drawing Sheets

(56) References Cited

U.S. PATENT DOCUMENTS

| | | | |
|---|---|---|---|
| 7,877,456 B2 | 1/2011 | Fein et al. | |
| 2003/0028506 A1 | 2/2003 | Yu | |
| 2004/0172408 A1* | 9/2004 | Klosterhalfen et al. | 707/103 R |
| 2005/0198062 A1 | 9/2005 | Shapiro | |
| 2010/0161569 A1* | 6/2010 | Schreter | 707/696 |
| 2011/0040731 A1 | 2/2011 | Gavade et al. | |
| 2011/0202927 A1 | 8/2011 | Miloushev et al. | |
| 2011/0264668 A1 | 10/2011 | Hacker | |
| 2012/0221845 A1* | 8/2012 | Ferris | 713/150 |

FOREIGN PATENT DOCUMENTS

| | | |
|---|---|---|
| CN | 101218557 | 7/2008 |
| CN | 101828182 | 9/2010 |
| CN | 101990666 | 3/2011 |
| WO | PCT/US12/35559 | 4/2012 |

OTHER PUBLICATIONS

Wikipedia, "Database Index", Internet Article, available at http://en.wikipedia.org/wiki/Index_(database), accessed Sep. 4, 2012.

Oracle, "Using Indexes in Database Applications", Oracle Database Advanced Application Developer's Guide, 11g Release 1(11.1) Part No. B28424-03, Chapter 5, 13 pgs, available at http://docs.oracle.com/cd/B28359_01/appdev.111/b28424/adfns_indexes.htm, Aug. 2008.

Website Databases, "Database Indexes", Internet article, available at http://www.websitedatabases.com/database_index.html, 2004-2012, 3 pgs, accessed Sep. 4, 2012.

www.ittoolbox.com, "Calculate size of index", Internet conversation thread, available at http://database.ittoolbox.com/groups/technical-function/db2-I/calculate-size-of-index-1157341, Sep. 4, 2006-Oct. 10, 2007.

Vijay Modi, "SQL Server Index Tuning/ Clustered vs Non-Clustered Indexes", Internet Blog, available at http://vijaymodi.wordpress.com/2007/03/24/sql-server-index-tuning-clustered-vs-non-clustered-indexes/, Mar. 24, 2007-Jun. 21, 2012.

F. Chang et al., "Bigtable: A distributed storage system for structured data", ACM Transactions on Computer Systems (TOCS) 26, No. 2 (2008) pp. 1-26.

Memcached, "What is Memcached", Internet website, available at http://memcached.org/, accessed Sep. 4, 2012.

Amazon Web Service; "Amazon ElastiCache", Internet website, available at http://aws.amazon.com/elasticache, accessed Sep. 5, 2012.

Microsoft Technet, "Index Tuning Wizard SQL Server 2000", Internet article, available at http://technet.microsoft.com/en-us/library/cc966541.aspx, Jul. 19, 2001.

* cited by examiner

MULTIPLE VARIABLE COVERAGE MEMORY FOR DATABASE INDEXING

CROSS-REFERENCE TO RELATED APPLICATION

This is a U.S. National Stage Application filing under 35 U.S.C. § 371 of International Application PCT/US12/35559, entitled "MULTIPLE VARIABLE COVERAGE MEMORY FOR DATABASE INDEXING", filed on Apr. 27, 2012, which is incorporated by reference herein in its entirety.

BACKGROUND

Unless otherwise indicated herein, the materials described in this section are not prior art to the claims in this application and are not admitted to be prior art by inclusion in this section.

Mainstream computer use is evolving from individually managed, stand-alone computing devices to connected devices that access software and/or data via a network connection. "Cloud computing" refers to a computing model in which computing resources may be accessed via a network connection, and resources available from the network may be referred to as "in the cloud".

Behind a network connection, a "cloud" may often comprise professionally managed hardware and software within a data center. A company that provides hardware and/or software within a data center, for use by its customers, is referred to herein as a "digital service provider".

One or more customers including, e.g., businesses and/or individuals, may store software and data on a platform including hardware and/or software provided by one or more digital service providers. Example customers may comprise, e.g., businesses engaging in ecommerce activities. Another example customer may comprise, e.g., "Software as a Service" (SaaS) providers. SaaS providers may supply application software that can be made available in a cloud to users.

Users that access a customer's software/data "in the cloud" may be referred to as "cloud clients" or "users". Therefore, in an example arrangement, a digital service provider may sell or otherwise provide cloud infrastructure to customers, and customers may sell or otherwise provide their goods/services to users accessing the cloud.

SUMMARY

The present disclosure generally describes technologies including devices, methods, and computer readable media relating to multiple variable coverage memory for database indexing. Some example methods may comprise receiving, by a second digital service provider, customer data from a first digital service provider. Disclosed methods may be performed to implement high-speed database access to the customer data as the second digital service provider builds an optimized, high-speed database index, referred to herein as an optimized index, for the customer data. Initially, the second digital service provider may maintain an appropriate level of service by keeping a basic, relatively slower performing index, referred to herein as a basic index, in a relatively high performance first memory. As the second digital service provider builds the optimized index, the second digital service provider may maintain the appropriate level of service by gradually shifting from use of the basic index in the first memory to the use of the optimized index in a relatively lower performance second memory. In some embodiments, response times for retrieving requested customer data records in response to received queries may be maintained approximately constant as the second digital service provider builds the optimized index and gradually transfers to using the second memory. In some embodiments, methods may include eventually discontinuing use of the basic index in the first memory.

Some example methods may comprise storing, e.g., by the second digital service provider, a database, and furthermore storing the basic index in the first memory associated with a first performance level; receiving database queries and modifying portions of the basic index for faster data retrieval, e.g., using database index optimization tools and techniques; storing some or all modified portions of the basic index as the optimized index in the second memory associated with a second performance level; and increasing the portions of the basic index stored as the optimized index in the second memory as the basic index is modified. During the modifying of the basic index, data retrieval may be performed using the basic and optimized indices, and data retrieval may increasingly use the optimized index. The first memory may comprise, for example, a high-speed cache with a relatively high performance level, while the second memory may comprise, for example, a lower-cost, relatively lower performance memory such as a disk type memory.

In some embodiments, methods may include measuring a time or number of table lookups involved in retrieving a requested data record using a portion of the basic index; comparing the time or number of table lookups to a performance requirement; and moving the portion of the basic index associated with retrieving the requested data record to the second memory when the time or number of table lookups meets the performance requirement. The portions of the optimized index stored in the second memory may comprise portions of the basic index that are configured to locate data records with fewer table lookups or in shorter times than portions of the basic index stored in the first memory. In some embodiments, the portions of the optimized index may comprise modified portions of the basic index which are configured to provide the faster responses to received queries.

Some example methods may comprise storing, in the first memory, a first (basic) database index; receiving queries and building a second (optimized) database index to provide faster responses to received queries than the basic index; storing the optimized index in the second memory; and during the building of the optimized index, responding to received queries using the basic index and the optimized index, and increasingly using the optimized index as the optimized index increases in size.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and a database performance balancing tool configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
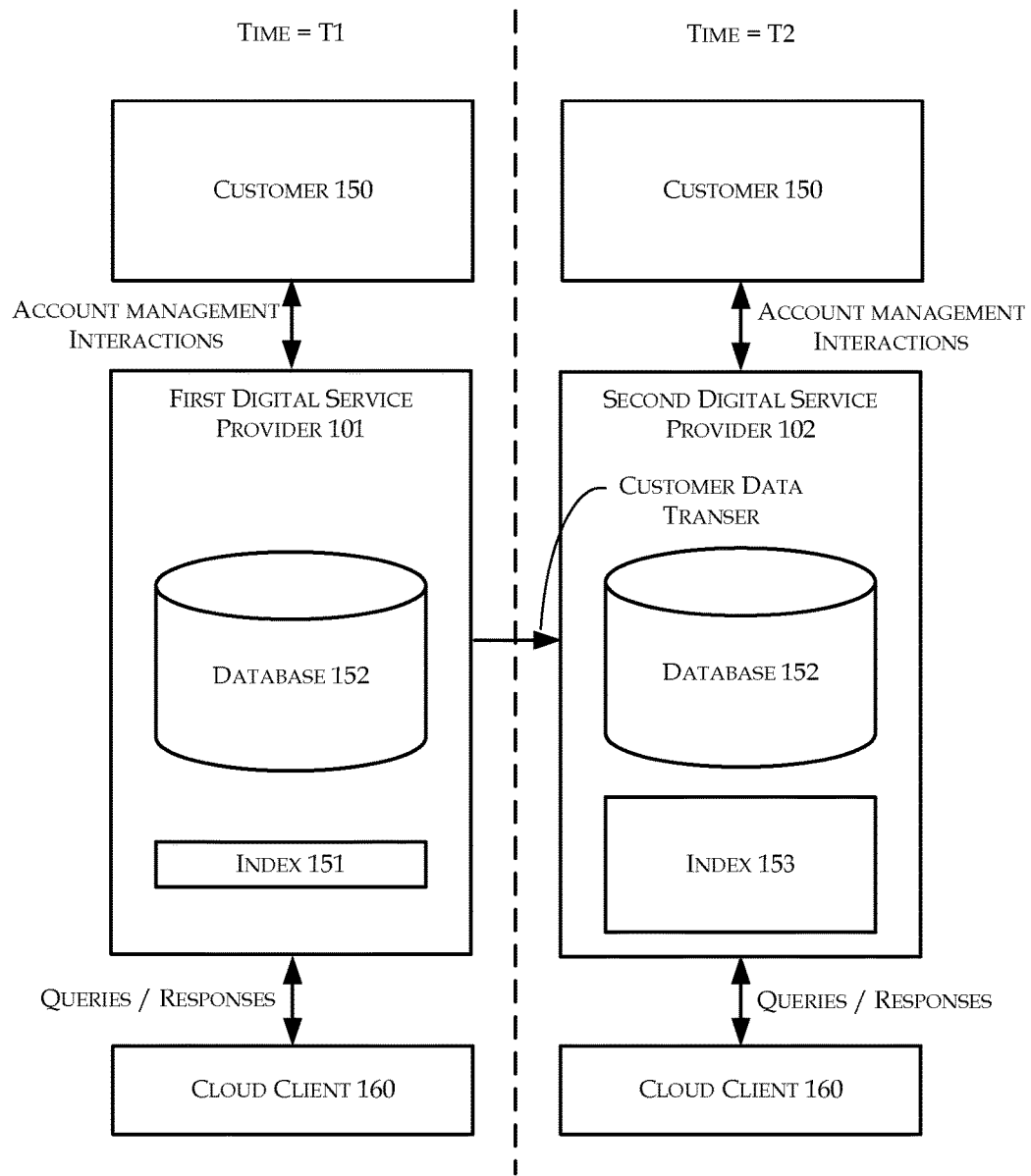
FIG. 1 is a diagram illustrating an example delivery of customer data from a first digital service provider to a second digital service provider.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to multiple variable coverage memory for database indexing. Disclosed methods may be performed to implement high-speed database access to digital service provider customer data as the digital service provider builds an optimized index for a database. Initially, the digital service provider may maintain an appropriate level of service by keeping a relatively slow performing, basic index in a relatively high performance first memory. As the digital service provider builds the optimized index, the digital service provider may maintain the appropriate level of service by gradually shifting from use of the first memory to the use of a relatively lower performance second memory.

FIG. 1 is a diagram illustrating an example delivery of customer data from a first digital service provider to a second digital service provider, arranged in accordance with at least some embodiments of the present disclosure. FIG. 1 includes a first digital service provider 101 configured to interact with a customer 150 and a cloud client 160 at time T1, and a second digital service provider 102 configured to interact with customer 150 and cloud client 160 at time T2. First digital service provider 101 comprises a database 152 and an index 151 at time T1. Second digital service provider 102 comprises database 152 and a basic index 153 at time T2.

In FIG. 1, customer 150 may initially, at time T1, maintain an account with first digital service provider 101, and customer 150 may for example interact with first digital service provider 101 via any of a variety of account management interactions, including, e.g., paying first digital service provider 101 for use of cloud infrastructure and services. Cloud client 160 may comprise, e.g. a consumer of customer 150's data stored in database 152. Cloud client 160 may be configured to access database 152 via queries to first digital service provider 101. In some embodiments, customer 150 and cloud client 160 may be a same entity, such as a same individual, business, or other organization.

First digital service provider 101 may be configured to use index 151, e.g., an index which may be proprietary to digital service provider 101, to retrieve data from database 152 in response to cloud client 160 queries. First digital service provider 101 may be configured to provide responses to cloud client 160 comprising data records retrieved from database 152.

For any reason, customer 150 may eventually decide to switch or add digital service providers, e.g., by opening an account with second digital service provider 102, effecting a customer data delivery to migrate database 152 to second digital service provider 102, and optionally close customer 150's account with first digital service provider 101. Any of a variety of techniques may be used to carry out the customer data delivery, e.g., first digital service provider 101 may be configured to encrypt database 152 and send database 152 via a network connection to second digital service provider 102, and second digital service provider 102 may be configured to receive and decrypt database 152. The customer data delivery may be effective to transfer or copy database 152 from first digital service provider 101 to second digital service provider 102, however, the customer data delivery may be ineffective to deliver index 151. For example, index 151 may be proprietary to first digital service provider 101 or otherwise inoperable by second digital service provider 102.

At time T2, customer 150 may maintain an account with second digital service provider 102, wherein customer 150 may for example interact with second digital service provider 102 via account management interactions. Cloud client 160 queries to database 152 may be directed to second digital service provider 102.

Second digital service provider 102 may be configured to initially use basic index 153 to retrieve data from database 152 in response to cloud client 160 queries. Second digital service provider 102 may be configured to provide responses to cloud client 160 comprising data records retrieved from database 152. Basic index 153 may for example comprise any index that can be constructed from database 152 by second digital service provider 102 without the benefit of a history of cloud client 160 queries. Because query data can be used to optimize an index to make it faster in responding to similar queries, and because initially, second digital service provider 102 may not have access to significant query history data for use in index optimization, basic index 153 may be a relatively low-performing index, in comparison to, e.g., to index 151 and/or to indices that may be built by second digital service provider 102 over time, e.g., optimized index 154 as discussed in connection with FIG. 2.

In general, database indices improve data retrieval speed at the cost of increased storage space and possibly slower write times as indices are updated. Digital service providers, such as data centers, need not incur slower write times, because index updating can be performed by a dedicated service, however, building an index takes time as well as knowledge of the types of queries being made.

Sometimes a digital service provider 102 may not have meta-information on data in database 152 being delivered in with migrating customer 150. For example, prior digital service provider 101 may be uncooperative with customer data delivery or perhaps prior digital service provider 101 is cooperative with customer data delivery but considers index 151 to be proprietary. In some cases index 151 may not be compatible with systems provided by second digital service provider 102. For example, current data centers tend to put complex proprietary systems behind even the most compatible key-value front end access Application Programming Interfaces (APIs) and focus on compatibility only on cloud client 160 facing interfaces. Such proprietary systems are often used because they allow data centers to use particular hardware configurations that may be preferred for historical or corporate reasons. In any case, there are times where optimized indices are not available at second digital service provider 102 for delivered data such as database 152.

Depending upon the circumstances of particular indices, creating and optimizing indices may not be trivial. Information may be required both to choose which variables to mix when forming index cardinalities, and in selecting which indices to generate. Even a modest "big data" index in use in today's data centers may have about 150-200 gigabytes (GB) of index space per property, without multiple interactions. With multiple interactions such an index may fill terabytes or even petabytes of memory space. To increase efficiency of indices, support staff who knows the data well may engage in manual indexing selections, and/or database optimization tools may be used. The manual index design method does not scale well to data center operations, especially when customer 150 may not want its data being read by data center staff.

Database optimization tools may comprise software configured to observe cloud client 160 queries and build indices based on observed queries. For example, the DB2 Database Management System (DBMS) made by IBM Corporation includes a database optimization tool called "Design Advisor". Design Advisor is configured to auto-index based on Bayesian learning of submitted queries. The SQL SERVER DBMS made by MICROSOFT Corporation includes a database optimization tool called "Index Tuning Wizard". TERADATA and NETEZZA DBMS have similar functions.

In automated index optimization, however, performance of database optimization tools may be related to available query data. For example, database optimization tools may be configured to use a large population of queries to optimize indices, as well as to reduce index size. Performance of a basic index such as 153 may be poor in comparison with an optimized index such as 154, however second digital service provider 102 may nonetheless have no alternative to basic index 153 until index optimization occurs. Moreover, second digital service provider 102 may want to provide a good first impression to customer 150 immediately upon customer migration, thus second digital service provider 102 may seek to provide fast performance during the transition time when faster indices and/or index optimizations are being built.

FIGS. 2A, 2B, 2C and 2D are diagrams illustrating database 152, a first memory 201, a second memory 202, and indices 153, 154 used by second digital service provider 102 to service queries from cloud client 160 at times T2, T3, T4, and T5, respectively, arranged in accordance with at least some embodiments of the present disclosure. FIGS. 2A, 2B, 2C and 2D may be referred to collectively as FIG. 2.

Figure 2A:
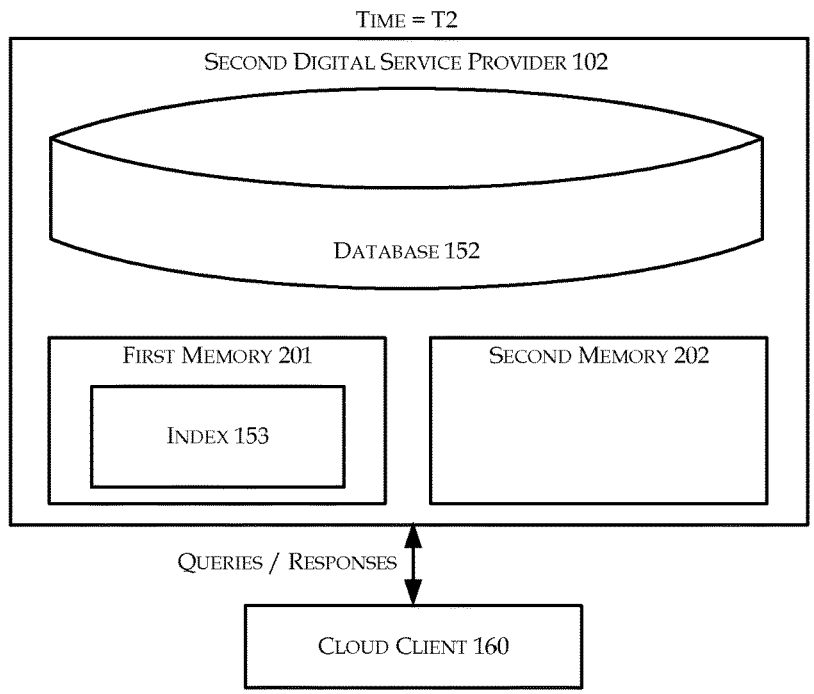
FIG. 2A is a diagram illustrating a database, first memory, second memory, and basic index used by the second digital service provider to service queries from a cloud client at a time T2.

In FIG. 2A, at time T2 corresponding to an initial delivery of database 152 to second digital service provider 102, second digital service provider 102 may be configured to store basic index 153 in first memory 201. Second digital service provider 102 may be configured to service queries from cloud client 160 by using basic index 153 to find requested data records in database 152, and to respond to cloud client 160 with responses including the requested data records.

In some embodiments, second digital service provider 102 may be configured to offer optimized database performance from initial launch of database 152 at second digital service provider 102, at time T2, by over-provisioning database 152 and/or basic index 153 with powerful resources for storage and/or computation. For example, basic index 153 may provide a multi-level naive index, and first memory 201 may comprise a fast but expensive memcache-type memory. In some embodiments, memcache-type memory may provide 150-180 microsecond (not millisecond) response times. A ten-level metadata index search in memcache may take as little as around 1.7 milliseconds (ms). In some embodiments, first memory 201 may comprise and elasticache-type memory, currently available in AMAZON web services.

This disclosure is not limited to any particular type of memory for use as first memory 201, and any memory type whether currently known or as may be developed in the future may be used in first memory 201, so long as first memory 201 is configured for comparatively faster performance than second memory 202. For example, in some embodiments, a first performance level, "high performance" or "fast" memory for use as first memory 201 may include any memory that is configured to operate at average query response times which are one half or less of average query response times of second memory 202. Conversely, a second performance level, "low performance" or "slow" memory for use as second memory 202 may include any memory that configured to operate at average query response times which are twice or more of average query response times of first memory 201. In some embodiments, a first performance level, "high performance" or "fast" memory for use as first memory 201 may include any memory that is configured to provide substantially the same or better average query response times with basic index 153, as second memory 202 can provide with optimized index 154, and vice versa.

In some embodiments, second memory 202 may comprise a Solid State Drive (SSD) or disk-type memory. Second memory 202 is not limited to any specific memory type, and any memory type that provides a second performance level which is slower than the first performance level provided by first memory 201, as described above, is acceptable for use in embodiments of this disclosure.

It will be appreciated that in some embodiments, first memory 201 may be supplemented or exchanged with any first hardware configured to allow faster operation of indices, and likewise, second memory 202 may be supplemented or exchanged with any second hardware configured to allow relatively slower operation of indices. For example, in some embodiments, first memory 201 may be supplemented or exchanged with relatively powerful computation/processing resources, including for example dedicated hardware such as one or more Field Programmable Gate Arrays (FPGAs) or other dedicated hardware configured to access basic index 153. Second memory 202 may be supplemented or exchanged with relatively lower power computation/processing resources, including for example non-dedicated hardware such as standard Central Processing Units (CPUs) for device(s) within second service provider 102 configured to accessed optimized index 154. Furthermore, this disclosure uses first memory 201 and second memory 202 as an example embodiment, however it will be appreciated that by extension, any number of different memory or other resource performance levels may be used. For example, a third memory, fourth memory, etc. may be included in the second digital service provider 102 of FIG. 2.

Figure 2B:
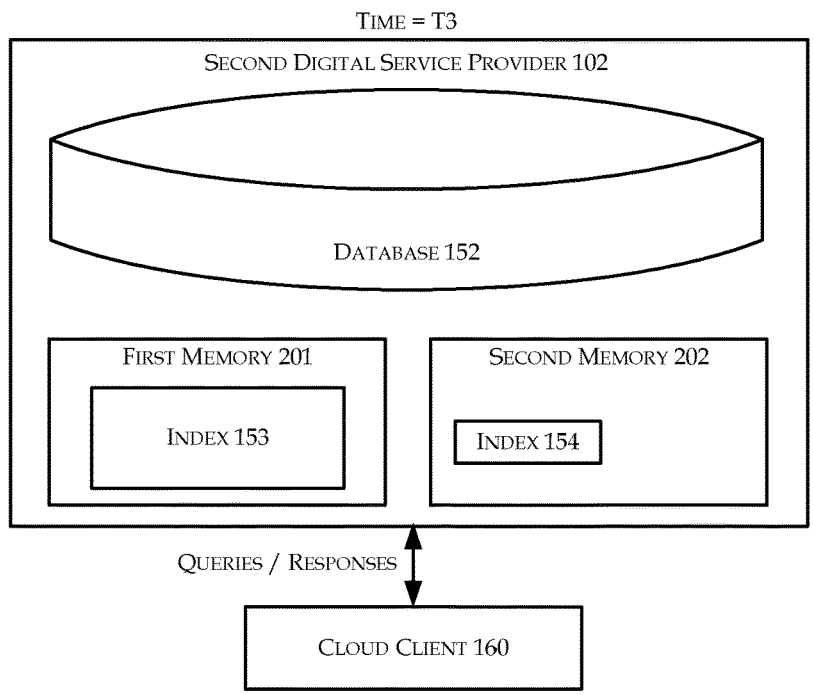
FIG. 2B is a diagram illustrating the database, first memory, second memory, and basic and optimized indices used by the second digital service provider to service queries from the cloud client at a time T3.

In FIG. 2B, at time T3 corresponding to an interval after time T2, second digital service provider 102 may be configured to store an optimized index 154 in second memory 202. Second digital service provider 102 may be configured to service queries from cloud client 160 by using indices 153 and 154 to find requested data records in database 152, and to respond to cloud client 160 with responses including the requested data records.

In some embodiments, a database optimization tool may modify basic index 153 to produce optimized index 154. As portions of basic index 153 are optimized, those portions can be moved or duplicated to second memory 202 and may serve as optimized index 154. In some embodiments, portions of basic index 153 to move to second memory 202 may be identified by their response speed, in terms of time and/or numbers of table lookups, in combination with, or independently of, whether such portions were modified by the database optimization tool. In other embodiments, the database optimization tool may build optimized index 154 as a second index, independent from basic index 153, and second digital service provider 102 may be configured to direct an increasing number of queries to optimized index 154 as second index increases in size and improves.

In some embodiments, second digital service provider 102 may be configured to use optimized index 154 such that average overall response times using optimized index 154 in second memory 202 are substantially equivalent to average overall response times using basic index 153 in first memory 201. For example, in this context, "substantially equivalent" response times may include average overall response times using basic index 153 may be 50% (or less) faster or slower than average overall response times using optimized index 154.

In some embodiments, second digital service provider 102 need not provide substantially equivalent overall response times with basic index 153 and optimized index 154. Response times using optimized index 154 which are faster or slower than basic index 153 may be acceptable. For example, in some circumstances, basic index 153 in first memory 201 may be used to prevent unacceptably slow initial performance, and optimized index 154 in second memory 202 may be significantly slower than basic index 153 in first memory 201, but nonetheless acceptable. In some circumstances, basic index 153 in first memory 201 may be used to provide slow but acceptable initial performance, and optimized index 154 in second memory 202 may be significantly faster than basic index 153 in first memory 201.

Figure 2C:
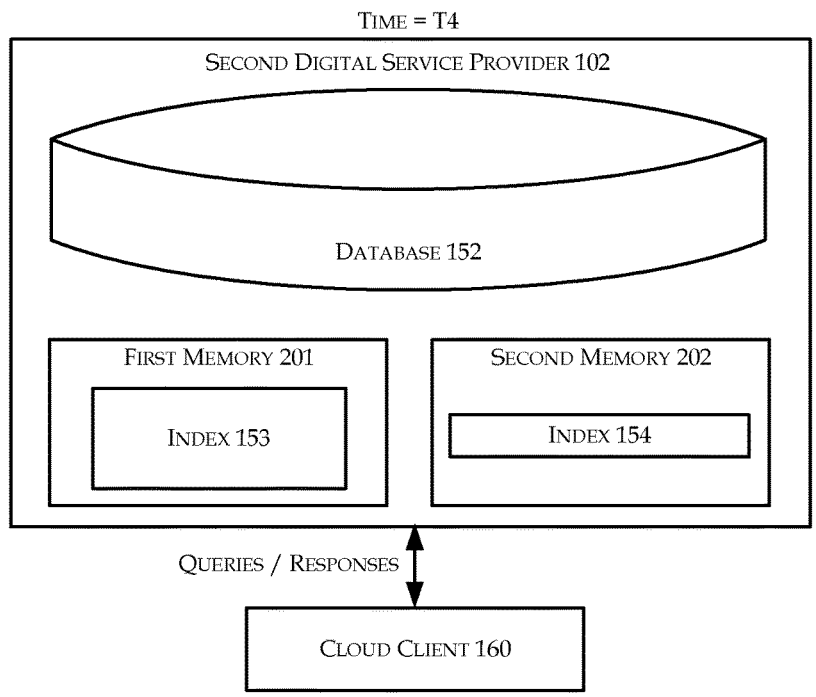
FIG. 2C is a diagram illustrating the database, first memory, second memory, and basic and optimized indices used by the second digital service provider to service queries from the cloud client at a time T4.

In FIG. 2C, at time T4 corresponding to an interval after time T3, second digital service provider 102 may be configured to store additional portions of basic index 153, as optimized index 154 in second memory 202. Second digital service provider 102 may be configured to service queries from cloud client 160 by using indices 153 and 154 to find requested data records in database 152, and to respond to cloud client 160 with responses including the requested data records.

In some embodiments, second digital service provider 102 may be configured to gradually reduce resources of first memory 201 provided for database 152 and/or basic index 153, e.g., reducing resources of first memory 201 used by basic index 153 at each of times T3, T4, and T5. Second digital service provider 102 may be configured to build optimized index 154 using progressive query data, and to store optimized index 154 in second memory 202. Second memory 202 may comprise a memory which can be provided at lower cost, albeit with lower performance, than first memory 201. Storing optimized index 154 in second memory 202 need not affect overall performance, because performance gains provided by optimized index 154 may offset performance loss associated with transitioning to second memory 202. Second digital service provider 102 may be configured to gradually increase resources of second memory 202 provided for database 152 and/or optimized index 154, e.g., at times T3, T4, and T5, as query data is gathered that allows building optimized index 154. In other words, second digital service provider 102 may systematically reduce resources of first memory 201 used in connection with database 152, e.g. by reducing resources of first memory 201 used at each of multiple successive time intervals. Second digital service provider 102 may systematically increase resources of second memory 202 used in connection with database 152, e.g. by increasing resources of first memory 201 used at each of multiple successive time intervals. Second digital service provider 102 may thereby achieve a long-term transition from use of first memory 201 to use of second memory 202, in connection with database 152.

Figure 2D:
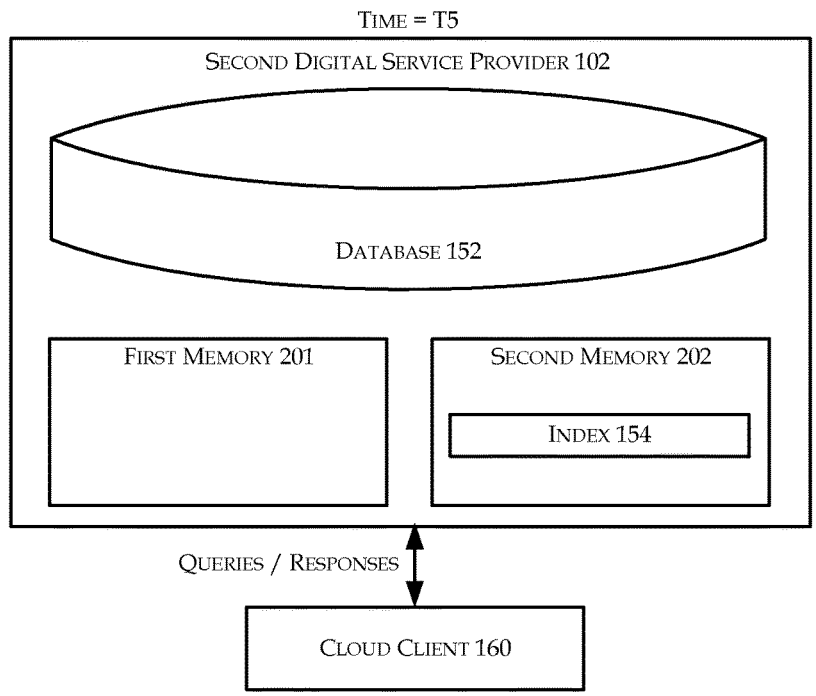
FIG. 2D is a diagram illustrating the database, first memory, second memory, and optimized index used by the second digital service provider to service queries from the cloud client at a time T5.

In FIG. 2D, at time T5 corresponding to an interval after time T4, second digital service provider 102 may be configured to store completed optimized index 154 in second memory 202. Second digital service provider 102 may be configured to service queries from cloud client 160 by using optimized index 154 to find requested data records in database 152, and to respond to cloud client 160 with responses including the requested data records. Second digital service provider 102 may optionally be configured to discontinue basic index 153, such as by deleting or otherwise discarding basic index 153, or evicting basic index 153 from first memory 201. In some embodiments, second digital service provider 102 may be configured to manage transition to use of optimized index 154 so as to maintain constant performance from time T2 to fully optimized steady-state operation at time T5, with minimal expense for over-provisioning.

In FIG. 2, second digital service provider 102 may be configured to temporarily accelerate access to database 152 with supplemental high performance relatively expensive resources such as provided in first memory 201 while building efficient database optimized index 154 so that performance requirements of second digital service provider 102 and/or customer 150 can be met while optimized index 154 is being constructed. As optimized index 154 is constructed, queries from cloud customer 160 may be increasingly served by the relatively cheaper resources of second memory 202 which use optimized index 154. Second digital service provider 102 may be configured to continuously adjust acceleration of access to database 152 via first memory 201, to provide desired database access service speeds from initial delivery at time T2.

In some embodiments, basic index 153 can be configured to service any query. However, use of basic index 153 may entail as many as 8-10 different index table lookups, or more, through basic index 153 as searches are performed for data records in database 152. Such a high number of index table lookups in basic index 153 may be considered unacceptable in many circumstances. For example, each check of a disk based query may take about ten milliseconds, resulting in overall query service times of 100-200 ms, for 8-10 index checks plus final disk access for a data record, plus communication and algorithm time. This compares with an expectation from an efficient index, such as optimized index 154, of around 3-50 ms for 1-2 index checks plus final disk access, communication and algorithm time.

To avoid delays associated with additional index table lookups in basic index 153, while minimizing operational costs, second digital service provider 102 may be configured to combine use of basic index 153 with use of initially small, but gradually increasing optimized index 154, while basic index 153 is run in high performance first memory 201.

In some embodiments, optimized index 154 may increase in size, and lower quality basic index 153 may decrease in size, e.g., by transferring coverage of data areas within database 152 from basic index 153 to optimized index 154. Thus at times T2, T3, T4, and T5, index coverage for database 152 goes from being dominated by basic index 153 at T2, to being dominated by optimized index 154 at T5, as query usage data is collected to optimize portions of basic index 153. Optimized index 154 may be configured to utilize fewer different index tables to return final positions of requested data records in database 152 than basic index 153, so optimized index 154 can be placed on a slower storage media associated with second memory 202, such as SSD or spinning disk, without necessarily reducing speed of access to database 152. In some embodiments, second digital service provider 102 may be configured to maintain roughly constant database performance over time as second digital service provider 102 transitions from basic index 153 in expensive first memory 201 to optimized index 154 in cheaper second memory 202.

In some embodiments, second digital service provider 102 may be configured to manage the use of basic index 153 in first memory 201 and optimized index 154 in second memory 202 according to relative costs of first memory 201 versus second memory 202. To calculate cost, second digital service provider 102 may be configured to determine a size of basic index 153, and to multiply the index size by the cost per unit of memory per unit of time, e.g., cost per GB per hour. The resulting cost figure may be applied in a function to determine, for example, performance requirements for optimized index 154. A high cost of memory 201 may justify lowering performance requirements for optimized index 154, so that use of optimized index 154 in lower cost memory 202 increases more rapidly. Conversely, a low cost of memory 201 may justify increasing performance requirements for optimized index 154, so that use of optimized index 154 in lower cost memory 202 increases more slowly.

In an example memory cost calculation, second digital service provider 102 may for example determine a size of basic index 153 to be around 170 GB. This is a reasonably expected index size for databases containing about a billion data records, although index size can vary widely with number of variables and richness of included data. Currently the cost per GB for first memory 201 of elasticache-type memory is around $0.03 per GB per hour. Thus cost for placing basic index 153, for the billion record database, in high performance first memory 201 can be estimated at roughly $5.00/hr or $100/day. Meanwhile, currently typical index optimizing techniques can take anywhere from a day to a month to create optimized index 154, depending on query frequency and query homogeneity. So costs associated with using first memory 201 for basic index 153 may be roughly $100 to $3,000 for the billion record database. Such costs can be adjusted by adjusting performance requirements as described above.

Figure 3:
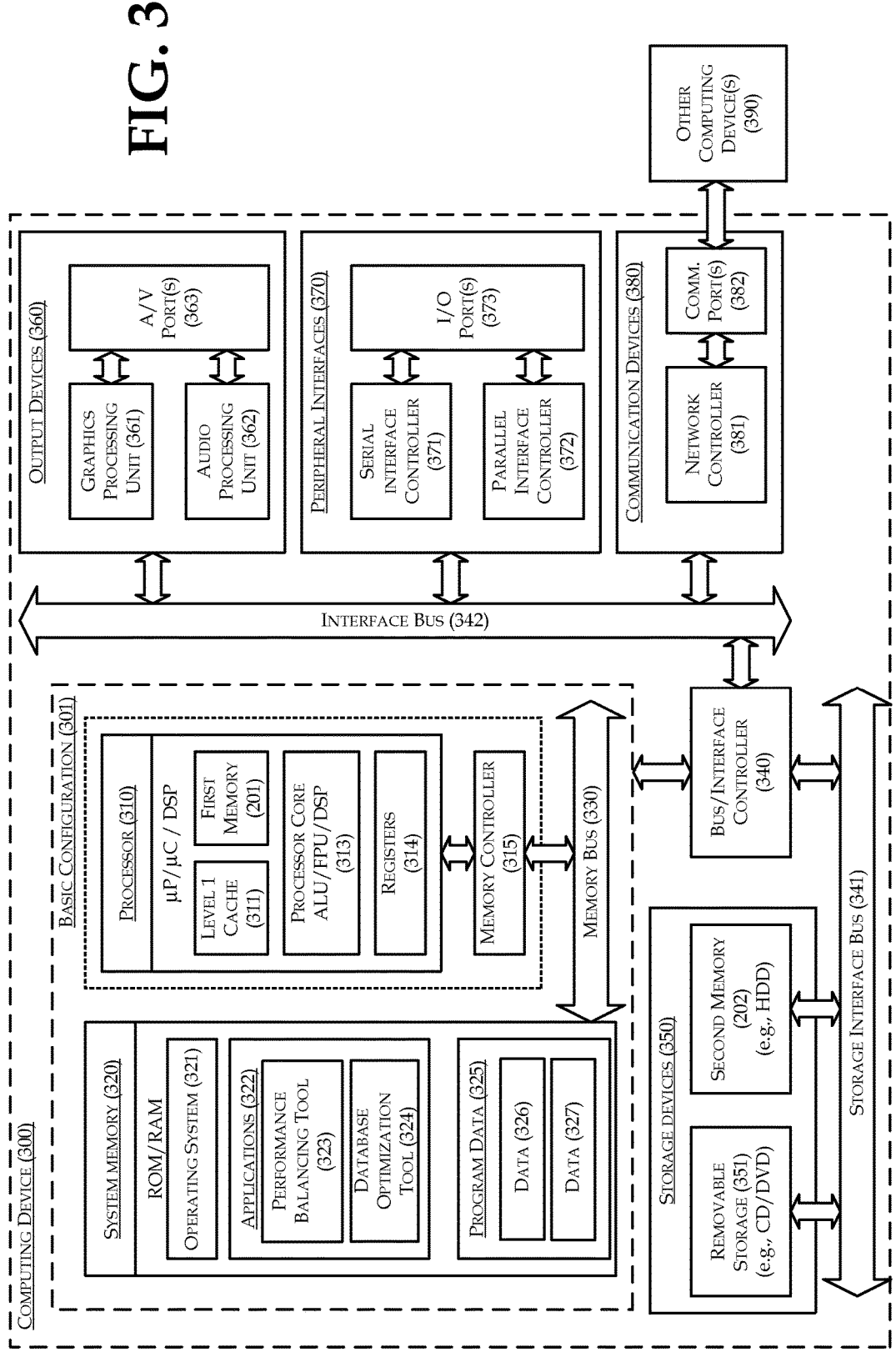
FIG. 3 is a diagram illustrating a computing device as one example of a digital service provider server.

FIG. 3 is a block diagram of a computing device 300 as one example of a digital service provider server, arranged in accordance with at least some embodiments of the present disclosure. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311 and a level two cache which may for example implement first memory 201, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 typically includes an operating system 321, one or more applications 322, and program data 325. In some embodiments, operating system 321 may comprise a virtual machine that is managed by a Virtual Machine Manager (VMM). Applications 323-324 may include, for example, performance balancing tool module(s) 323 and database optimization tool module(s) 324. Program data 326-327 may include data 326 and data 327 that may be used by applications 323-324, respectively.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices which may for example implement second memory 202, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 311, first memory 201, system memory 320, removable storage 351, and second memory 202 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 300. Any such computer storage media may be part of device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 may include a serial interface controller 371 or a parallel interface controller 372, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 373. Other conventional I/O devices may be connected as well such as a mouse, keyboard, and so forth. An example communications device 380 includes a network controller 381, which may be arranged to facilitate communications with one or more other computing devices 390 over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may be implemented as a server in a data center provided by second digital service provider 102. Computing device 300 may also be implemented as any server that takes over a database in any number of other contexts. Computing device 300 may also be implemented as a personal or business use computer including both laptop computer and non-laptop computer configurations.

Figure 4:
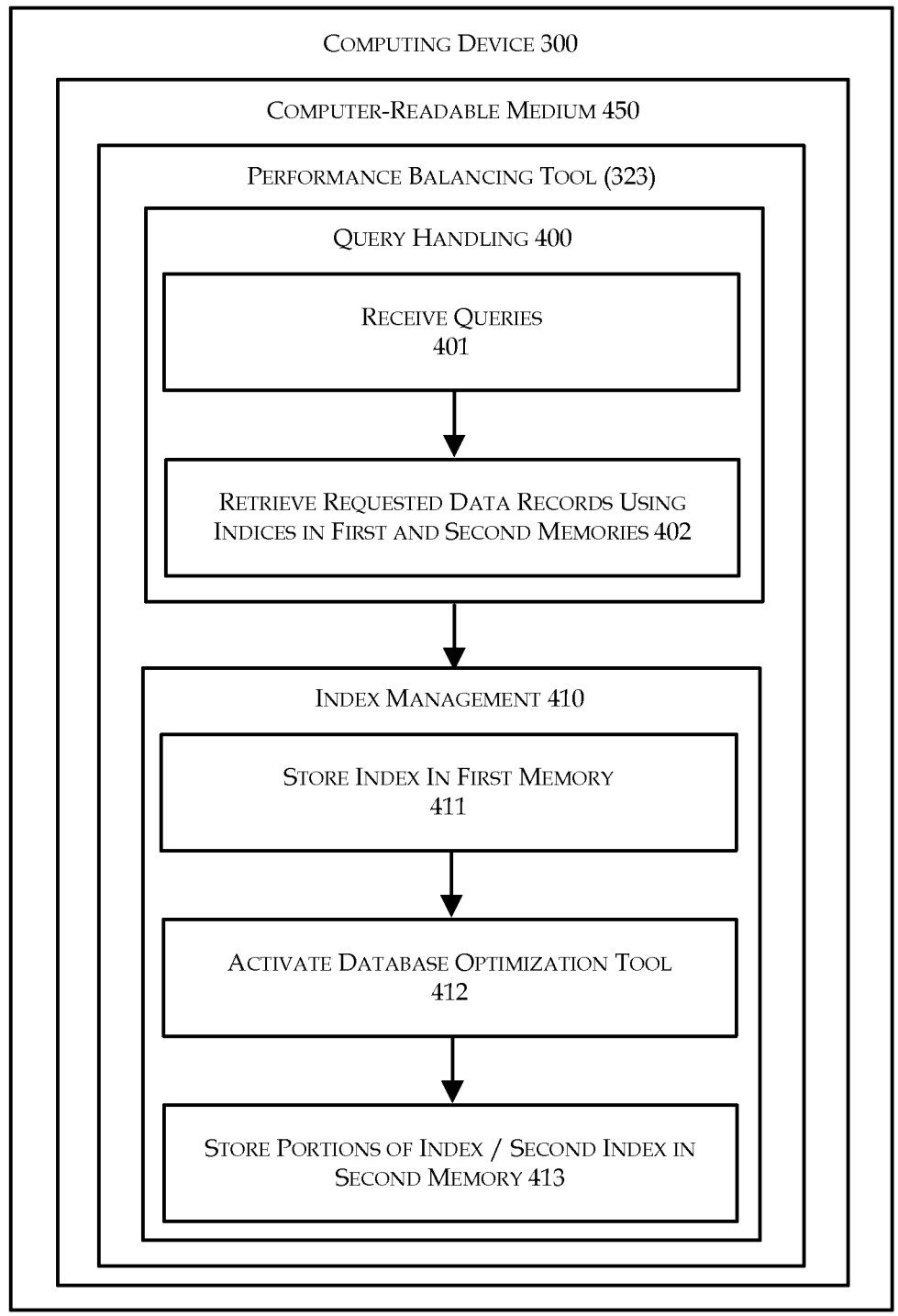
FIG. 4 is a flow diagram illustrating an example method configured to implement performance balancing.

FIG. 4 is a flow diagram illustrating an example method configured to implement performance balancing, arranged in accordance with at least some embodiments of the present disclosure. The example flow diagram may include one or more operations/modules as illustrated by blocks 323, 400-402 and 410-413, which represent operations as may be performed in a method, functional modules in a computing device 300, and/or instructions as may be recorded on a computer readable medium 450. The illustrated blocks 323, 400-402 and 410-413 may be arranged to provide functional operations of performance balancing tool 323, including one or more of "Query Handling" at block 400 and "Index Management" at block 410. Block 400 may comprise "Receive Queries" at block 401 and "Retrieve Requested Data Records Using Indices in First and Second Memories" at block 402. Block 410 may comprise "Store Index in First Memory" at block 411, "Activate Database Optimization Tool" at block 412, and/or "Store Portions of Index/Second Index in Second Memory" at block 413.

In FIG. 4, blocks 323, 400-402 and 410-413 are illustrated as including blocks being performed sequentially, e.g., with block 400 first and block 410 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 300 operated by second service provider 102 may gradually create optimized index 154, while shifting from using basic index 153 in first memory 201 to optimized index 154 in second memory 202. In some embodiments, methods according to FIG. 4 may include, inter alia, storing, by block 411, in first memory 201 associated with a first performance level, basic index 153 configured to locate data records in database 152; receiving, by block 401, queries comprising requests for one or more of the data records in database 152; modifying, by database optimization tool 324 activated by block 412, basic index 153 using query data corresponding to received queries to configure basic index 153 to provide faster responses to received queries; storing, by block 413, one or more portions of basic index 153 as optimized index 154 in second memory 202 associated with a second performance level, wherein the second performance level is lower than the first performance level; increasing, by block 413, the portions of basic index 153 stored as optimized index 154 in second memory 202 as basic index 153 is modified; and retrieving, by block 402, requested data records in response to received queries, wherein during the modifying of basic index 153, the retrieving is performed using portions of basic index 153, 154 in first and second memories 201 and 202, respectively, and wherein the retrieving increasingly uses the portions of optimized index 154 in second memory 202 as the portions of optimized index 154 in second memory 202 are increased.

In some embodiments, methods according to FIG. 4 may include, inter alia, storing, by block 411, in first memory 201 associated with a first performance level, basic index 153 configured to locate data records in database 152; receiving, by block 401, queries comprising requests for one or more of the data records in database 152; building, by database optimization tool 324 activated by block 412, a second, optimized index 154 configured to locate the data records in database 152, wherein building optimized index 154 comprises using query data corresponding to received queries to configure optimized index 154 to provide faster responses to received queries than basic index 153, and wherein optimized index 154 increases in size pursuant to the building; storing, by block 413, optimized index 154 in second memory 202 associated with a second performance level, wherein the second performance level is lower than the first performance level; and retrieving, by block 402, requested data records in response to received queries, wherein during the building of optimized index 154, the retrieving is performed using basic index 153 and optimized index 154, and wherein the retrieving increasingly uses optimized index 154 as optimized index 154 increases in size.

In a "Performance Balancing Tool" block 323, computing device 300 may be configured to perform all operations pursuant to servicing queries directed to database 152 while balancing performance of database 152 as optimized index 154 is created. Block 323 may include blocks 400 and 410.

In a "Query Handling" block 400, computing device 300 may be configured to receive and respond to queries from cloud customers, while providing query data for use in index optimization. Block 400 may include blocks 401 and 402.

In a "Receive Queries" block 401, computing device 300 may be configured to receive queries from cloud customers. Received queries may take a variety of forms. In some embodiments, received queries may be calls to database 152 received via a network connecting second service provider 102 with cloud client 160. In some embodiments, database 152 may support a website, e.g., an ecommerce website, and queries may be generated as part of a user session on the website. Services included in the website may generate calls to database 152. In such embodiments, block 401 may comprise receiving queries generated within computer 300 or another computer provided by second service provider 102. Block 401 may be followed by block 402.

In a "Retrieve Requested Data Records Using Indices in First and Second Memories" block 402, computing device 300 may be configured to use basic index 153 and optimized index 154, in first memory 201 and second memory 202, respectively, to retrieve data records from database 152 as requested in queries received in block 401.

In some embodiments, block 410 may be configured to maintain an index routing table that establishes which queries to direct to basic index 153, and which queries to direct to optimized index 154, as described below. Block 402 may be configured to determine a query type of a received query, and to refer to the index routing table to determine an appropriate index to use. In some embodiments, query type may correspond to portions of database 152 covered by indices 153 and 154. Block 402 may be configured to use the appropriate index to retrieve requested data records from database 152, and to respond, e.g., to cloud customer 160 or to another requesting process, by providing retrieved data records. As optimized index 154 increases in size, the index routing table may be updated to direct more queries to optimized index 154.

In some embodiments, block 402 may be configured to direct some portion of all queries, regardless of query type, to basic index 153, and some portion of all queries, regardless of query type, to optimized index 154. As optimized index 154 increases in size, block 402 may be configured to direct a larger proportion of all queries to optimized index 154.

In some embodiments, block 400 may be configured to measure query response times and/or numbers of index table lookups (also referred to herein as index calls) between receiving a query in block 401 and retrieving requested data record(s) in block 402. Block 400 may furthermore be configured to correlate measured query response times/number of index calls with query type. In particular, block 400 may correlate measured query response times/number of index calls with whether optimized index 154 or basic index 153 was used to service a query. Query handling performance data may be provided for use by index management 410 as described below. Block 400 may be followed by block 410.

In an "Index Management" block 410 computing device 300 may be configured to manage indices 153, 154 stored in first and second memories 201, 202, respectively. Block 410 may include blocks 411-413.

In a "Store Index in First Memory" block 411, upon initially receiving database 152, computing device 300 may be configured to store basic index 153 in first memory 201. Block 411 may be followed by block 412.

In an "Activate Database Optimization Tool" block 412, computing device 300 may be configured to activate database optimization tool 324 to begin optimizing basic index 153 and/or creating a second index from scratch, using received queries to optimize query response times. In some embodiments, block 412 may be configured to adapt block 402 to provide query data to database optimization tool 324. Block 412 may be followed by block 413.

In a "Store Portions of Index/Second Index in Second Memory" block 413, in some embodiments, computing device 300 may be configured to store portions of basic index 153 in second memory 202, as optimized index 154. In some embodiments, block 413 may be configured to determine which portions of basic index 153 are optimized, e.g., by operation of database optimization tool 324. Block 413 may be configured to communicate with database optimization tool 324 to ascertain which portions of basic index 153 have been optimized. Block 413 may be configured to store the optimized portions of basic index 153 as optimized index 154 in second memory 202, so that optimized index 154 comprises modified portions of basic index 153 which are configured to provide faster responses to received queries.

In some embodiments, block 413 may be configured to determine which portions of basic index 153 are configured to locate data records with fewer index calls or in shorter times than remaining portions of basic index 153, and to move those portions to optimized index 154 in second memory 202. For example, in some embodiments, block 413 may be configured to store portions of basic index 153 as optimized index 154 in second memory 202 when such portions of basic index 153 are configured to locate data records with 5 or fewer index calls, or when such portions otherwise meet a performance requirement comprising an allowable number of index calls. In some embodiments, block 413 may be configured to store portions of basic index 153 as optimized index 154 in second memory 202 when such portions of basic index 153 are configured to locate data records in a time of 50 milliseconds or shorter, or when such portions otherwise meet a performance requirement comprising an allowable retrieval time.

In some embodiments of block 413, computing device 300 may be configured to store optimized index 154 in second memory 202, as an independent second index, rather than building optimized index 154 from portions of basic index 153. Second, optimized index 154 may be configured to locate data records with fewer index calls and/or in shorter times than first, basic index 153. For example, optimized index 154 may be configured to locate data records with 5 or fewer table lookups, or otherwise in a number of table lookups that meets a table lookup performance requirement. Second index may be configured to locate data records in database 152 in a time of 50 milliseconds or shorter, or otherwise in a time that meets a speed performance requirement. Further aspects of block 413 are described below in connection with FIG. 5.

Figure 5:
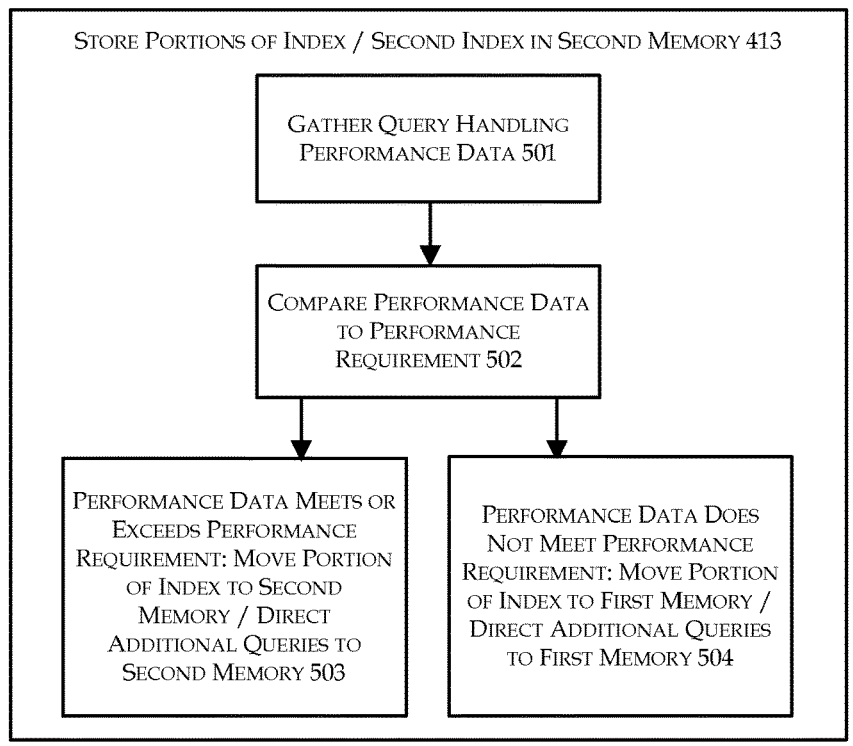
FIG. 5 is a flow diagram illustrating an example method configured to store modified portions of a basic index and/or a second index in a second memory in connection with performance balancing.

FIG. 5 is a flow diagram illustrating an example method configured to store portions of an index and/or a second index in a second memory in connection with performance balancing, arranged in accordance with at least some embodiments of the present disclosure. The example flow diagram may include one or more operations/modules as illustrated by blocks 413 and 501-504, which represent operations as may be performed in a method, functional modules in a computing device 300, and/or instructions as may be recorded on a computer readable medium 450, as illustrated in FIG. 4. The illustrated blocks 413 and 501-504 may be arranged to provide functional operations of storing portions of an index and/or a second index in second memory 413, including one or more of "Gather Query Handling Performance Data" at block 501, "Compare Performance Data to Performance Requirement" at block 502, "Performance Data Meets or Exceeds Performance Requirement: Move Portion of Index to Second Memory/Direct Additional Queries to Second Memory" at block 503, and "Performance Data Does Not Meet Performance Requirement: Move Portion of Index to First Memory/Direct Additional Queries to First Memory" at block 503.

In FIG. 5, blocks 413 and 501-504 are illustrated as including blocks being performed sequentially, e.g., with block 501 first and block 503 or 504 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which computing device 300 may be configured to implement storing portions of basic index 153 and/or a second index in second memory 202 according to block 413 in FIG. 4.

In a "Gather Query Handling Performance Data" block 501, computing device 300 may be configured to gather query handling performance data, e.g., which data may be provided by block 400 as described above. Query handling performance data may comprise query response times, as well as correlations between query response times and usage of optimized index 154 or basic index 153. In some embodiments, query handling performance data may furthermore comprise information identifying particular portion(s) of an index used in responding to a query. Block 501 may be followed by block 502.

In a "Compare Performance Data to Performance Requirement" block 502, computing device 300 may be configured to compare data gathered in block 501 with performance requirements. In some embodiments, a single query response time performance requirement, e.g., 50 ms or less, may be established for all queries, regardless of index. In some embodiments, different performance requirements may be established for different indices, and block 502 may be configured to compare data gathered in block 501 with performance requirement(s) for the index used to service a corresponding query. Block 502 may be followed by block 503 or 504.

In a "Performance Data Meets or Exceeds Performance Requirement: Move Portion of Index to Second Memory/Direct Additional Queries to Second Memory" block 503, in some embodiments, computing device 300 may be configured to move a portion of basic index 153 to second memory 202 when determined in block 502 that query handling performance data meets or exceeds a performance requirement. For example, when query handling performance data indicates that a query was serviced in 30 ms and a performance requirement for the query was 50 ms or less, the query handling performance data exceeds the performance requirement by being faster than the performance requirement, and a portion of basic index 153 corresponding to the query may be moved to second memory 202. In some embodiments, computing device 300 may be configured to direct additional queries to second memory 202 when determined in block 502 that query handling performance data meets or exceeds a performance requirement. For example, when query handling performance data indicates that average overall query response times for optimized index 154 meet or exceed a performance requirement, block 503 may be configured to direct additional queries to optimized index 154 in second memory 202. For example, if average overall query response times for optimized index 154 are 49 ms and a performance requirement for average overall query response times was 50 ms or less, the query handling performance data exceeds the performance requirement by being faster than the performance requirement, and block 503 may be configured to direct additional queries to optimized index 154 in second memory 202.

In a "Performance Data Does Not Meet Performance Requirement: Move Portion of Index to First Memory/Direct Additional Queries to First Memory" block 504, in some embodiments, computing device 300 may be configured to move a portion of optimized index 154 back to first memory 201 when determined in block 502 that query handling performance data does not meet a performance requirement. For example, when query handling performance data indicates that a query was serviced in 60 ms and a performance requirement for the query was 50 ms or less, the query handling performance data does not meet the performance requirement by being slower than the performance requirement, and a portion of optimized index 154 corresponding to the query may be moved to second memory 202. In some embodiments, computing device 300 may be configured to direct additional queries to first memory 201 when determined in block 502 that query handling performance data does not meet a performance requirement. For example, when query handling performance data indicates that average overall query response times for optimized index 154 does not meet a performance requirement, block 503 may be configured to direct additional queries to basic index 153 in first memory 201. For example, if average overall query response times for optimized index 154 are 51 ms and a performance requirement for average overall query response times was 50 ms or less, the query handling performance data does not meet the performance requirement by being slower than the performance requirement, and block 503 may be configured to direct additional queries to basic index 153 in first memory 201.

Blocks 501-504 may be performed at any interval. In some embodiments, blocks 501-504 may be performed according to a time interval, e.g., every 10 seconds. In some embodiments, blocks 501-504 may be performed according to a query interval, e.g., every 100,000 queries. In some embodiments, blocks 501-504 may be performed each time optimized index 154 is modified by database optimization tool 324.

In some embodiments, block 413 may be configured to maintain the index routing table that establishes which queries to direct to basic index 153, and which queries to direct to optimized index 154, for use by query handling block 400 as described above. For example, block 413 may be configured to update the index routing table each time a portion of basic index 153 is moved to optimized index 154. In some embodiments, the index routing table may correlate query types with index 153 or 154. In some embodiments, the index routing table may correlate query portions of database 152 with index 153 or 154.

Figure 6:
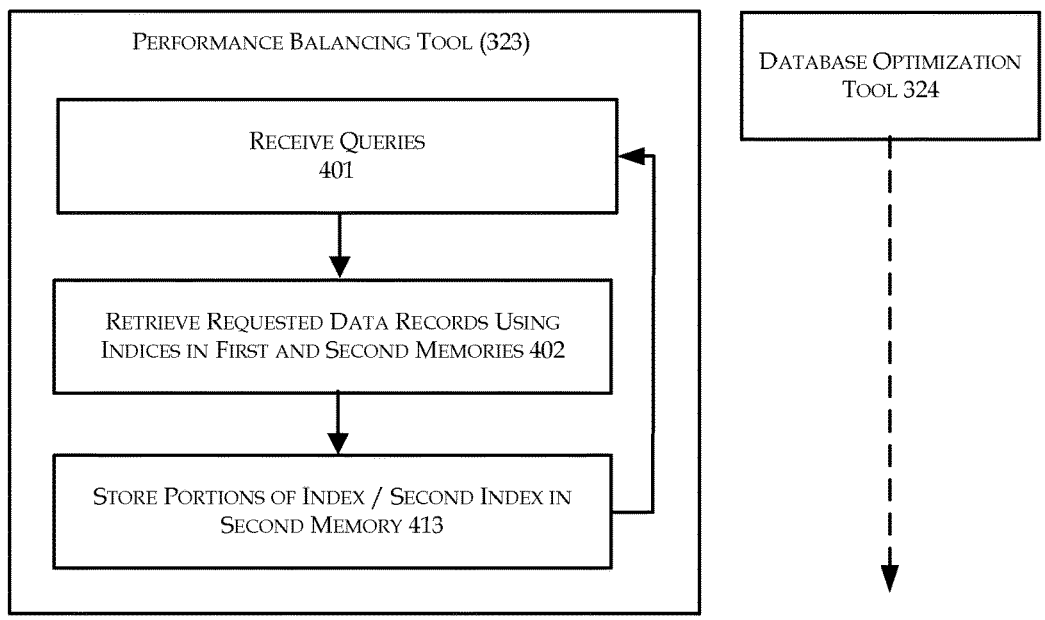
FIG. 6 is a flow diagram illustrating an example method configured to implement performance balancing during operation of a database optimization tool.

FIG. 6 is a flow diagram illustrating an example method configured to implement performance balancing during operation of database optimization tool 324, arranged in accordance with at least some embodiments of the present disclosure. The example flow diagram may include one or more operations/modules as illustrated by blocks 323, 401, 402, 413, and 324 which represent operations as may be performed in a method, functional modules in a computing device 300, and/or instructions as may be recorded on a computer readable medium 450, as illustrated in FIG. 4. The illustrated blocks 323, 401, 402, 413, and 324 may be arranged to provide functional operations of performance balancing according to block 323, during operation of database optimization tool 324. Block 323 may include one or more of "Receive Queries" at block 401, "Retrieve Requested Data Records Using Indices in First and Second Memories" at block 402, and/or "Store Portions of Index/Second Index in Second Memory" at block 413.

In FIG. 6, blocks 401, 402, and 413 are illustrated as including blocks being performed sequentially, e.g., with block 401 first and block 413 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates an example method by which computing device 300 may be configured to implement performance balancing after basic index 153 is stored in first memory 201, according to block 411, and after database optimization tool 324 is activated, according to block 412. In some embodiments, during continuous operation of database optimization tool 324, blocks 401, 402, and 413 may be replayed in a substantially continuous loop, e.g., block 413 may evaluate performance and determine whether to move portions of basic index 153, or change query routing, after each query is serviced. In some embodiments, during continuous operation of database optimization tool 324, blocks 401 and 402 may operate to service all incoming queries, and block 413 may operate at intervals as described above. Each of the blocks illustrated in FIG. 6 is described above.

Figure 7:
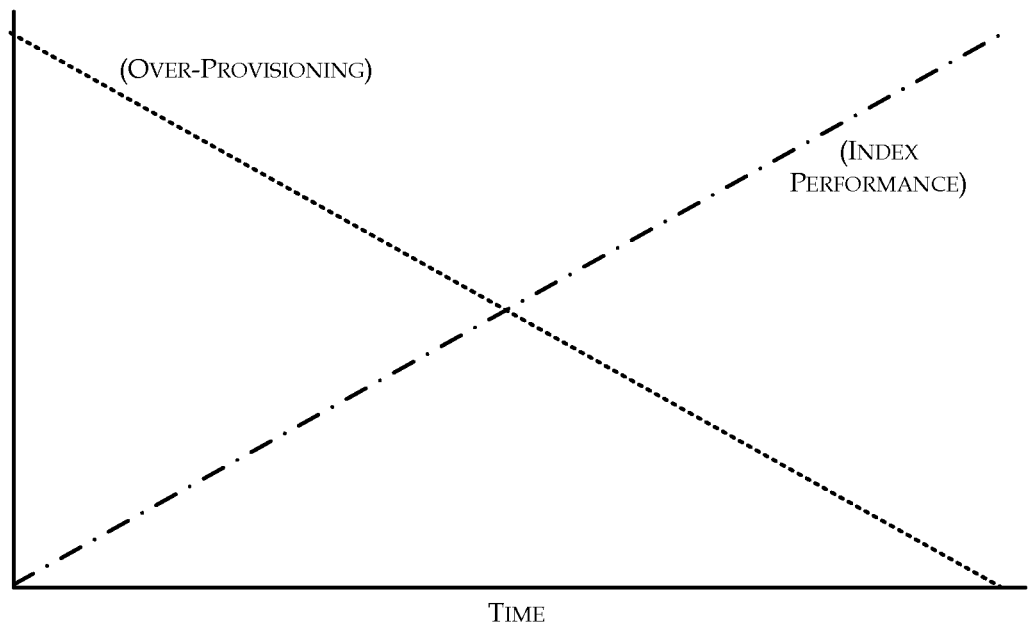
FIG. 7 is a graph illustrating example resource over-provisioning versus index performance over time.

FIG. 7 is a graph illustrating example resource over-provisioning versus index performance over time, arranged in accordance with at least some embodiments of the present disclosure. FIG. 7 illustrates initially high over-provisioning with low index performance. Over time, index performance improves with the use of optimized index 154, and so over-provisioning may be reduced.

The index performance curve in FIG. 7 may also be viewed as a query samples curve, because index performance improves with number of query samples to use for index optimization. As second digital service provider 102 builds up a history of query samples, second digital service provider 102 may be configured to decrease resource over-provisioning to provide a substantially constant performance level. The over-provisioning may be implemented using split-media index storage approach as described herein, so that performance of a relatively low quality index using high performance memory resources substantially matches performance of a relatively high quality index using lower performance memory a high quality, lower cost index as the higher quality index is under construction, thereby normalizing performance over time as the transition in this FIG. 7 takes place.

Figure 8:
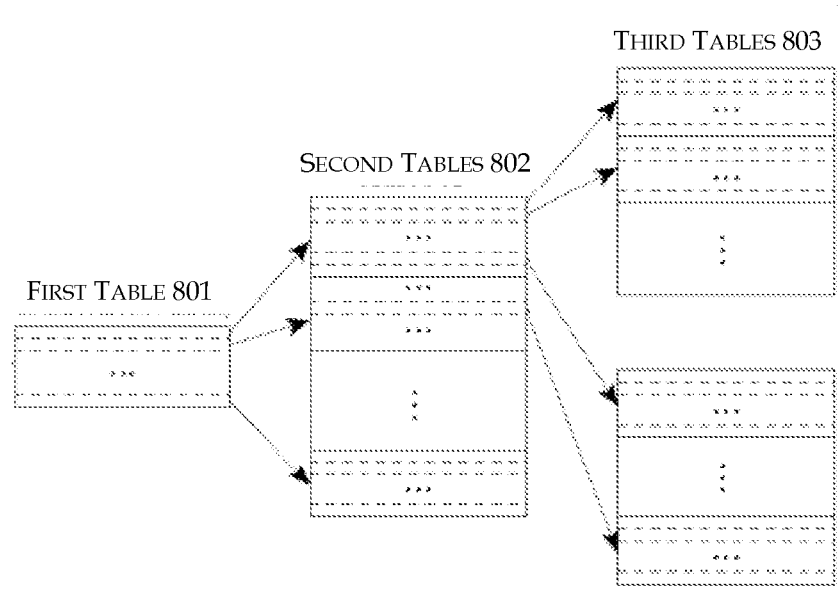
FIG. 8 is a diagram illustrating multiple index table accesses for retrieving a data record from a database, all arranged in accordance with at least some embodiments of the present disclosure.

FIG. 8 is a diagram illustrating multiple index table lookups/index calls for retrieving a data record from a database, arranged in accordance with at least some embodiments of the present disclosure. FIG. 8 illustrates an example key-value store with multiple index tables. Third tables 803 may comprise actual locations of one or more key-values; however multiple levels of metadata trees above third tables 803, in the form of second tables 803 and first table 801, may be accessed in order to correctly access third tables 803. Lower optimization indexes typically manifest as larger metadata tables with more layers of them in the tree, resulting in more index reads to find the eventual address of target data records in a database. For example, it is common for a completely naive index to be 8-10 tables deep, while a well designed index may be organized in order of most unique relations first and with clever multifold coverage may often be able to locate records (at least at the block level where the rest may be sorted algorithmically) using 1-2 tables/index calls.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method comprising:

receiving a database by a cloud digital service provider;

subsequent to receiving the database, initially storing a basic database index by the cloud digital service provider, wherein the basic database index is initially stored in a first memory associated with a first performance level, wherein the basic database index is configured to locate data records in the database, and wherein the basic database index comprises key values to locate the data records in the database;

building an optimized database index configured to locate data records in the database, wherein the optimized database index comprises key values to locate the data records in the database;

storing the optimized database index in a second memory associated with a second performance level, wherein the second performance level is lower speed than the first performance level, and wherein the first performance level is higher speed than the second performance level;

gradually shifting, during the building of the optimized database index, from use of the basic database index in the first memory to locate data records in the database, to use of the optimized database index in the second memory to locate data records in the database, to thereby transition from index coverage for the database being dominated by the basic database index in the first memory to index coverage for the database being dominated by the optimized database index in the second memory;

wherein building the optimized database index comprises:
receiving queries comprising requests for one or more of the data records in the database and modifying the basic database index using query data corresponding to received queries to configure the optimized database index to provide faster responses to received queries.

2. The method of claim 1, wherein the optimized database index is configured to locate data records with fewer table lookups or in shorter times than the basic database index.

3. The method of claim 2, wherein the optimized database index is configured to locate data records with 5 or fewer table lookups.

4. The method of claim 2, wherein the optimized database index is configured to locate data records in a time of 50 milliseconds or shorter.

5. The method of claim 1, further comprising:

measuring a time or number of table lookups involved in retrieving a requested data record using a portion of the basic database index;

comparing the time or number of table lookups to a performance requirement; and moving the portion of the basic database index to the optimized database index when the time or number of table lookups meets the performance requirement.

6. The method of claim 1, wherein the database as received by the cloud digital service provider comprises the data records without accompanying query history data from a prior cloud digital service provider.

7. The method of claim 1, further comprising discontinuing the basic database index in the first memory, and subsequently retrieving requested data records using the optimized database index in the second memory, to thereby discontinue use of the first memory in connection with responding to queries for data records in the database.

8. The method of claim 1, wherein the first memory comprises a cache-type memory.

9. The method of claim 1, wherein the second memory comprises a disk-type memory.

10. The method of claim 1, wherein a response time to retrieve requested data records in response to received queries is maintained approximately constant while gradually shifting from use of the basic database index to use of the optimized database index.

11. The method of claim 1, wherein the modifying the basic database index using query data corresponding to received queries to configure the optimized database index to provide faster responses to received queries is performed by a database index optimization tool.

12. A non-transitory computer readable storage medium having computer executable instructions executable by a processor, the instructions that, when executed by the processor, cause the processor to:

receive a database by a cloud digital service provider;

subsequent to the database being received, initially store a basic database index by the cloud digital service provider, wherein the basic database index is stored in a first memory associated with a first performance level, wherein the basic database index is configured to locate data records in the database, and wherein the basic database index comprises key values to locate the data records in the database;

build an optimized database index configured to locate data records in the database, wherein the optimized database index comprises key values to locate the data records in the database;

store the optimized database index in a second memory associated with a second performance level, wherein the second performance level is lower speed than the first performance level, and wherein the first performance level is higher speed than the second performance level;

gradually shift, during the building of the optimized database index, from use of the basic database index in the first memory to locate data records in the database, to use of the optimized database index in the second memory to locate data records in the database, to thereby transition from index coverage for the database being dominated by the basic database index in the first memory to index coverage for the database being dominated by the optimized database index in the second memory;

wherein the instructions that cause the processor to build the optimized database index comprise instructions that cause the processor to:
receive queries comprising requests for one or more of the data records in the database and modify the basic database index using query data corresponding to received queries to configure the optimized database index to provide faster responses to received queries.

13. A server computer comprising:

a processor;

a memory; and a database performance balancing tool stored in the memory and executable by the processor, wherein the database performance balancing tool is configured to:

receive a database by a cloud digital service provider;

subsequent to the database being received, initially store a basic database index by the cloud digital service provider, wherein the basic database index is stored in a first memory associated with a first performance level, wherein the basic database index is configured to locate data records in the database, and wherein the basic database index comprises key values to locate the data records in the database;

build an optimized database index configured to locate data records in the database, wherein the optimized database index comprises key values to locate the data records in the database;

store the optimized database index in a second memory associated with a second performance level, wherein the second performance level is lower speed than the first performance level, and wherein the first performance level is higher speed than the second performance level;

gradually shift, during the building of the optimized database index, from use of the basic database index in the first memory to locate data records in the database, to use of the optimized database index in the second memory to locate data records in the database, to thereby transition from index coverage for the database being dominated by the basic database index in the first memory to index coverage for the database being dominated by the optimized database index in the second memory;

wherein the database performance balancing tool is configured to receive queries comprising requests for one or more of the data records in the database and modify the basic database index using query data corresponding to received queries to configure the optimized database index to provide faster responses to received queries.

14. The server computer of claim 13, wherein the optimized database index is configured to locate data records with fewer table lookups or in shorter times than the basic database index.

15. The server computer of claim 13, wherein the database performance balancing tool is configured to:

measure a time or number of table lookups involved in retrieving a requested data record using a portion of the basic database index;

compare the time or number of table lookups to a performance requirement; and move the portion of the basic database index to the optimized database index when the time or number of table lookups meets the performance requirement.

16. The server computer of claim 13, wherein the database as received by the cloud digital service provider comprises the data records without accompanying query history data from a prior cloud digital service provider.

17. The server computer of claim 13, wherein the database performance balancing tool is configured to discontinue the basic database index in the first memory, and subsequently retrieve requested data records using the optimized database index in the second memory, to thereby discontinue use of the first memory in connection with responding to queries for data records in the database.

18. The server computer of claim 13, wherein the first memory comprises a cache-type memory and wherein the second memory comprises a disk-type memory.

* * * * *